United States Patent [19]

Dewing et al.

[11] Patent Number: 4,612,103
[45] Date of Patent: Sep. 16, 1986

[54] ALUMINIUM REDUCTION CELLS

[75] Inventors: Ernest W. Dewing; Adam J. Gesing, both of Kingston; Thomas J. Hudson, Beaconsfield, all of Canada; Louis J. Manfredo, Painted Post, N.Y.; Douglas J. Wheeler, Cleveland Heights, Ohio; William R. Bennett, North Olmstead, Ohio; Thomas M. Clere, Willowick, Ohio

[73] Assignee: Alcan International Limited, Montreal, Canada

[21] Appl. No.: 675,732

[22] Filed: Nov. 28, 1984

[30] Foreign Application Priority Data

Nov. 29, 1983 [GB] United Kingdom ............ 8331769
Jul. 9, 1984 [GB] United Kingdom ............ 8417542

[51] Int. Cl.$^4$ .................... C25C 3/08; C25C 3/16
[52] U.S. Cl. ............................ 204/243 R; 204/279
[58] Field of Search .............. 204/67, 243 R–247, 204/279

[56] References Cited

U.S. PATENT DOCUMENTS

| | | | |
|---|---|---|---|
| 2,915,442 | 12/1959 | Lewis | 204/243 R X |
| 4,071,420 | 1/1978 | Foster, Jr. et al. | 204/67 |
| 4,177,128 | 12/1979 | Rahn | 204/243 R |
| 4,338,177 | 7/1982 | Withers et al. | 204/243 R |
| 4,341,611 | 7/1982 | Kaplan | 204/243 R |
| 4,396,481 | 8/1983 | Pawlek et al. | 204/243 R |
| 4,511,449 | 4/1985 | Molnar | 204/243 R |
| 4,533,452 | 8/1985 | Leroy et al. | 204/291 X |

Primary Examiner—Donald R. Valentine
Attorney, Agent, or Firm—Cooper, Dunham, Griffin & Moran

[57] ABSTRACT

An aluminium reduction cell includes an anode 10, electrolyte 12, a cathode 14, a potlining 16 which may be of alumina and cathode current collectors embedded therein. The collectors include a section comprising a major proportion by volume of bodies 22, e.g. of titanium diboride or a $TiB_2$/Al cermet, joined or surrounded by aluminium, the section being so positioned that the aluminium is at least partly fluid when the cell is in operation. The bodies, which are preferably close-packed, may be cubic or cuboid or in the form of sheets or thin slabs arranged with their major faces parallel to one another and to the axis of the collector section. The collectors show good electrical conductivity together with satisfactory resistance to magnetic stirring and impact and transverse forces.

13 Claims, 6 Drawing Figures

ALUMINIUM REDUCTION CELLS

BACKGROUND

This invention relates to aluminium reduction cells, and particularly to the problem of cathode current collection therein. These cells are of the kind in which the electrolyte comprises molten cryolite $Na_3AlF_6$ containing dissolved alumina $Al_2O_3$, and electrolysis is performed between an anode suspended in the electrolyte and a cathode at the floor of the cell. In conventional cells, the floor is of carbon in which are embedded steel members connected to the external electricity supply. The carbon potlining transmits the electric current to the steel connecting members; but carbon is a rather poor electrical conductor, with the result that the cell voltage is higher than would be the case if a better cathode current collector were used.

U.S. Pat. No. 3,093,570 (Dewey) and British Patent Application No. 2065174 (Odek) both show cathodes of titanium diboride $TiB_2$ mounted in aluminium slabs for connection to the external electricity supply. $TiB_2$ is a better electrical conductor than carbon; but it is expensive and difficult to form, and has low mechanical strength and a coefficient of thermal expansion very much greater than that of carbon or alumina or other potlining material.

Due partly to the penetration by electrolyte, which inevitably occurs, the lining of a cell is generally not dimensionally stable. During the course of a cell campaign, the lining usually expands, but the expansion is not uniform. As a result, cathode current collectors embedded in the cell floor and walls are subjected to compressive forces and to shear forces in an unpredictable manner. Monolithic $TiB_2$ current collectors react to such forces by breaking, which may severely affect their current-carrying ability. For all these reasons, solid $TiB_2$ cathodes have not achieved any significant commercial success.

It would be convenient and cheap to use cathode current collectors of aluminium metal. The fact that aluminium melts (660° C.) far below the normal cell operating temperatures (950°–980° C.) means that the high-temperature end of such collectors would be fluid, but that does not in principle make them unsuitable. In practice however, it is found that thermal convection and magnetic effects cause efficient stirring of the molten metal. This results in downward movement of the solid-liquid boundary and an unwanted increase in thermal conduction. Also, crystallisation of alumina, cryolite and other phases can occur in the molten metal. For these reasons such collectors cannot be used unless special precautions are taken.

In U.S. Pat. No. 3,607,685 (Johnson) there are described various designs of cathode current collector which are intended to overcome these difficulties. One design comprises an outer refractory tube containing a number of parallel spaced refractory rods or fibres surrounded by molten aluminium; the rods or fibres, which are intended to restrain molten metal circulation, may be made of or coated with a material which is wet by aluminium metal. Another design uses aluminium alloys that have higher melting points and higher viscosities than commercial primary aluminium. Yet another design uses conductor assemblies each comprising a refractory tube and an aluminium core conductor, the high-temperature end of each being positioned at the bottom of a bowl-shaped depression in the cell potlining.

All the designs in the Johnson patent are characterized by the fact that the section of the cathode current collector adjoining the molten aluminium cathode (the pad) is molten and mixes with the pad. We have found that this use of molten metal as the conductor of electricity in the upper section of the collector places severe restrictions on the design and positioning of the collector. Collectors of this kind only work well if the associated magnetic fields are kept to a minimum. Unless this is done, and unless the cross-section of the collector is kept at a low level, magnetic stirring generates high molten metal velocity resulting in the problems noted above.

Johnson suggests the use of refractory rods or fibres in the molten metal to counteract magnetic stirring. He also notes that the use of granular refractory material is not effective for the purpose. But we have found that it is in practice difficult to design cathode current collectors which contain enough (non-conducting) refractory material to counteract magnetic stirring, while nevertheless containing enough molten metal to provide sufficient electrical conductivity.

THE INVENTION

The present invention aims to overcome this problem by the use of refractory materials which are electrically conducting and which occupy a major part of the volume of the collector, in conjunction with molten metal. Several designs are described which take advantage of the novel combination.

The invention thus provides an aluminium reduction cell including a potlining and embedded therein at least one cathode current collector (collector, collector bar) including a section comprising a major proportion by volume of discrete electrically-conducting aluminium-wettable bodies joined or surrounded by a minor proportion by volume of aluminium-containing metal, the section being so positioned that the metal is at least partly fluid when the cell is in operation.

The proportion by volume of the metal-wettable bodies should be chosen, in conjunction with the design and intended position of the collector in the cell, to be sufficient to substantially prevent rapid metal motion as a result of magnetic stirring. Usually, the section will comprise at least 60%, and often more than 80%, by volume of the metal-wettable bodies with metal occupying the remaining volume. Usually, though not always, the metal-wettable bodies will carry at least 30% and often more than 50% of the electric current with the molten metal carrying only a minor proportion. In these circumstances the molten metal can be regarded as a flexible joint providing electrical connections between adjacent metal wettable bodies. In operation, such collectors are much less prone to damage caused by dimensional changes in the potlining than would be monolithic bars of refractory material.

The metal-wettable bodies are preferably present in a close-packed array (i.e. with each body touching its neighbour). The bodies may take the form of powder or granules or small pieces of irregular shape. Alternatively, they may take the form of plates or discs of area equal to the cross-section of the collector, stacked together to form the collector.

Preferably, regular shapes are used having a cross-section smaller than the cross-section of the collector but large enough not to be readily shifted by magnetic stirring of the molten metal. Thus, a random cross-section of the collector will generally include cross-sections of a few, e.g. 2 to 8 shapes present side by side. The shapes may be spherical in order to simplify manufacture. But for various operational reasons, it is preferred that the shapes are cubic or cuboid, and particularly that the shapes are arranged with some faces parallel to the longitudinal axis of the current collector and other faces perpendicular to the axis. When the shapes are cuboid, it is generally preferable to align them with a long dimension parallel to the axis of the collector.

One advantage resulting from the use of cubic or cuboid (rectangular) shapes is that they pack well together and occupy a major proportion, approaching 100%, of the volume of the section of the collector. In the interstices between the shapes, metal is present mainly in the form of thin films. Although this metal in which the shapes are embedded becomes molten during operation of the cell, its small volume minimises the convection and magnetic stirring effects that have in the past caused problems.

Another advantage is that a current collector, of for example cylindrical shape and composed of an array of cubic or cuboid shapes arranged parallel and perpendicular to its longitudinal axis and embedded in Al-containing metal, is rather resistant to radial compressive forces. The array is not easily squeezed and elongated in an axial direction, as would be the case if the shapes were for example spherical. On the other hand, the array readily yields to shear forces, particularly in a direction perpendicular to the longitudinal axis of the collector. As the array yields to shear forces, the fluid metal maintains electrical conduction.

The bodies or shapes are formed of electrically conducting Al-wettable material which is resistant to attack both by molten Al and by cell electrolyte, but whose nature is not otherwise critical. One suitable material is titanium diboride ($TiB_2$); another is a $TiB_2/Al$ composite containing a sufficiently low proportion of Al to remain solid under the prevailing conditions, for example as described in European Patent Specification 115688; yet another is a $TiB_2/Al_2O_3/Al$ material containing a sufficiently high proportion of $TiB_2$ to have adequate electrical conductivity, for example as described in European Patent specification 116809. In these cases the Al-containing metal performs the additional function of protecting the shapes from corrosion. At elevated temperature, the resistivities of these materials—molten Al: $TiB_2/Al$ cermet: $TiB_2$: $TiB_2/Al_2O_3$ composite—are approximately—25: about 50: 60 to 70: and greater than 100 micro-ohm cm respectively.

DRAWINGS

Reference is directed to the accompanying drawings, in which.

Like references denote like parts in the various figures.

Figure 1:
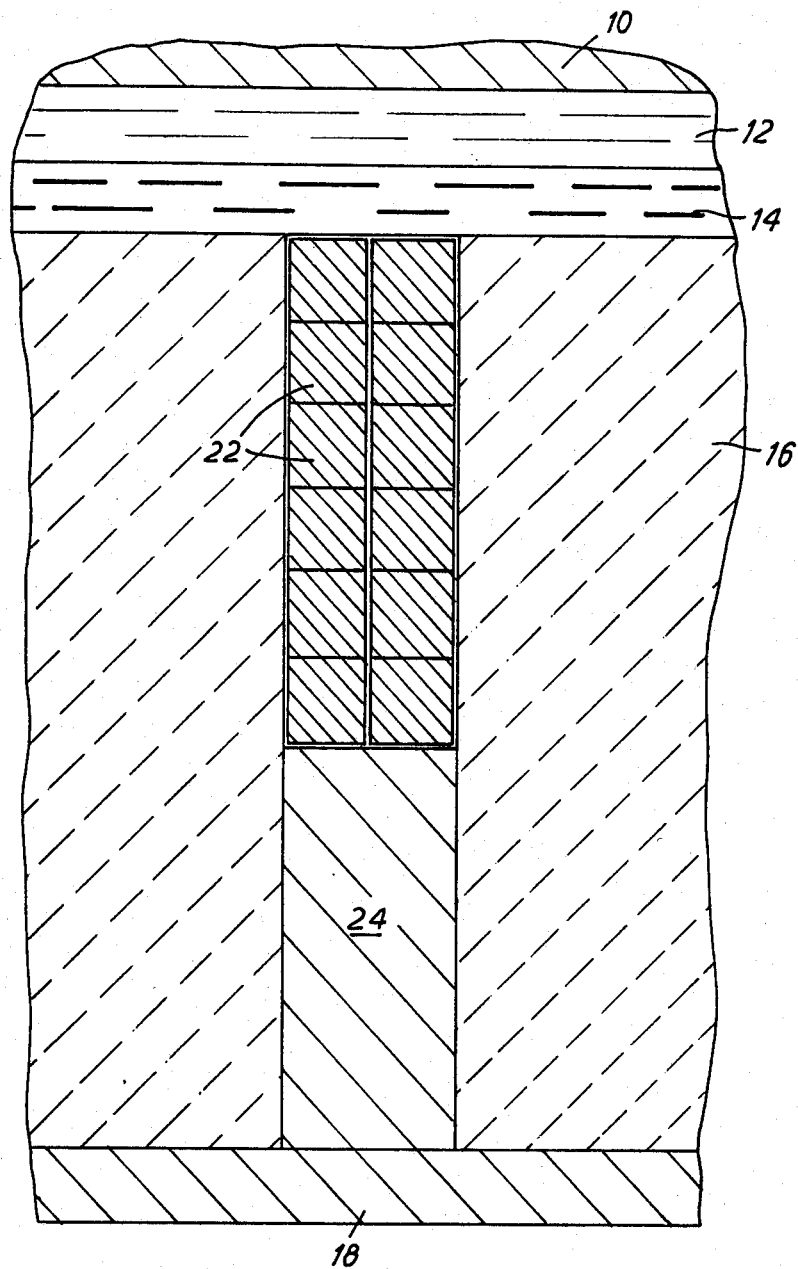
FIG. 1 is a sectional side elevation through part of an aluminium reduction cell showing one construction of cathode current collector.

Referring to FIG. 1, an aluminium reduction cell comprises an anode 10, molten cryolite-based electrolyte 12, a layer of molten aluminium metal 14 constituting the cathode, and cell potlining 16, the whole resting on a slab 18 of aluminium metal. A cathode current collector embedded in the potlining comprises an upper section consisting of an array of cubic shapes 22 surrounded by aluminium which is at least partly fluid when the cell is in operation, and a lower section consisting of a solid bar 24 of aluminium metal. The shapes 22 are of electrically-conducting metal-wettable refractory material resistant to both molten aluminium and cell electrolyte, such as titanium diboride. The upper section is of square cross-section 5 cm×5 cm, and contains layers of four cubes. The section may be formed by vacuum impregnating the array of cubes with molten Al.

Figure 3:
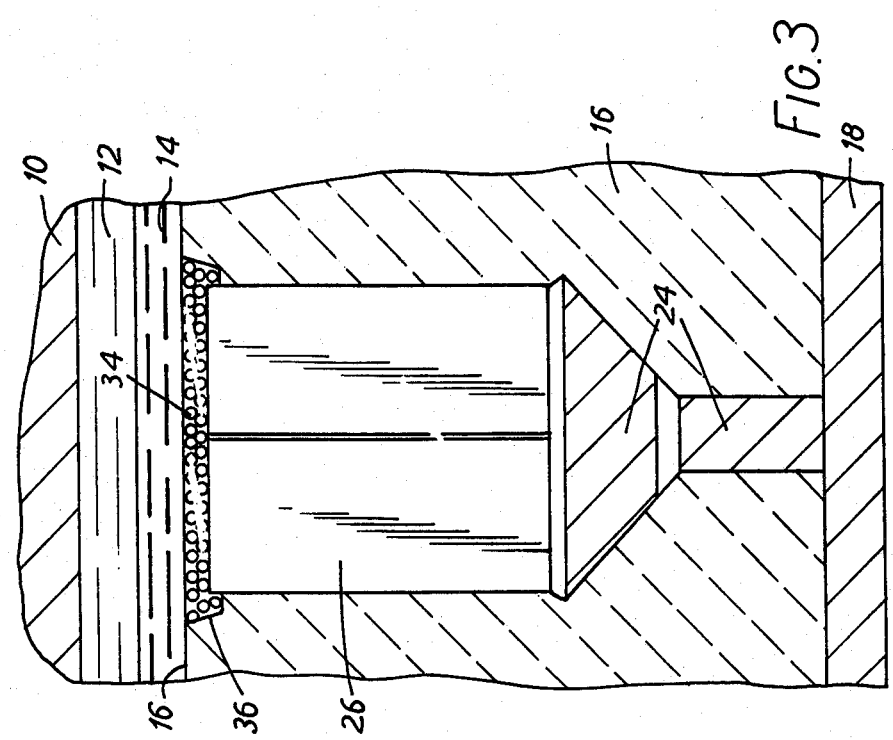
FIG. 3 is a sectional end elevation along the line 3—3 of FIG. 2.
Figure 2:
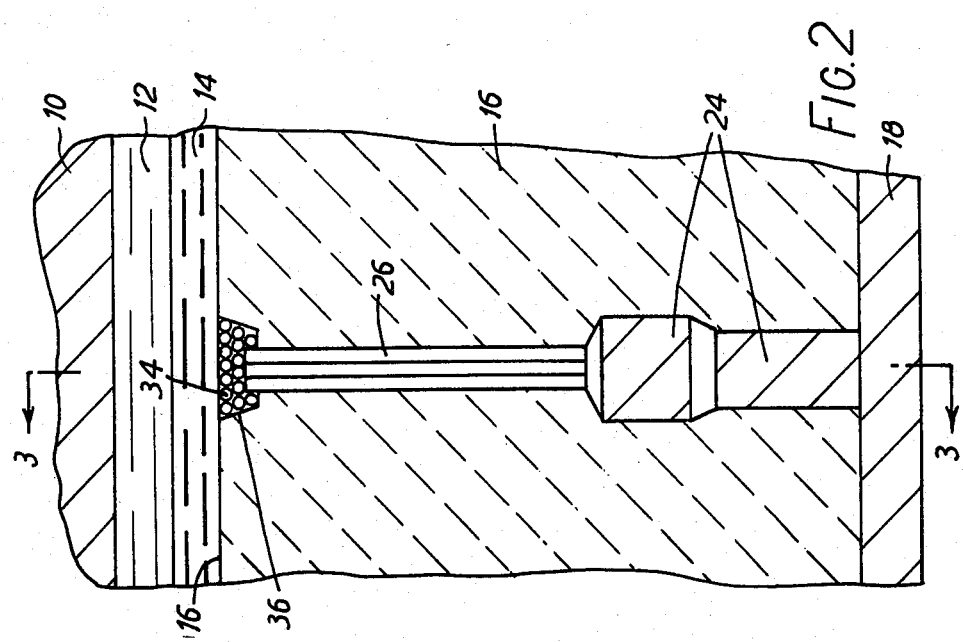
FIG. 2 is a corresponding view showing a different construction.

In FIGS. 2 and 3, a cathode current collector embedded in the cell potlining 16 comprises an upper section consisting of three plates 26 positioned vertically and joined by aluminium which is at least partly fluid when the cell is in operation, and a lower section consisting of a solid bar 24 of aluminium metal. The top edges of the plates 26 are in contact at 28 with the layer of molten aluminium metal 14 in the cell, and are positioned in a depression 36 formed in the potlining 16 which is filled with solid metal-wettable spheres 34, e.g. formed of or coated with $TiB_2$, with molten metal in the interstices. Each plate 26 has a length corresponding to the length of the section and a width corresponding to half the width of the section, both length and width being large compared to thickness, so that the collector is of rectangular cross-section. The plates are preferably of a $TiB_2/Al$ composite.

Figure 4:
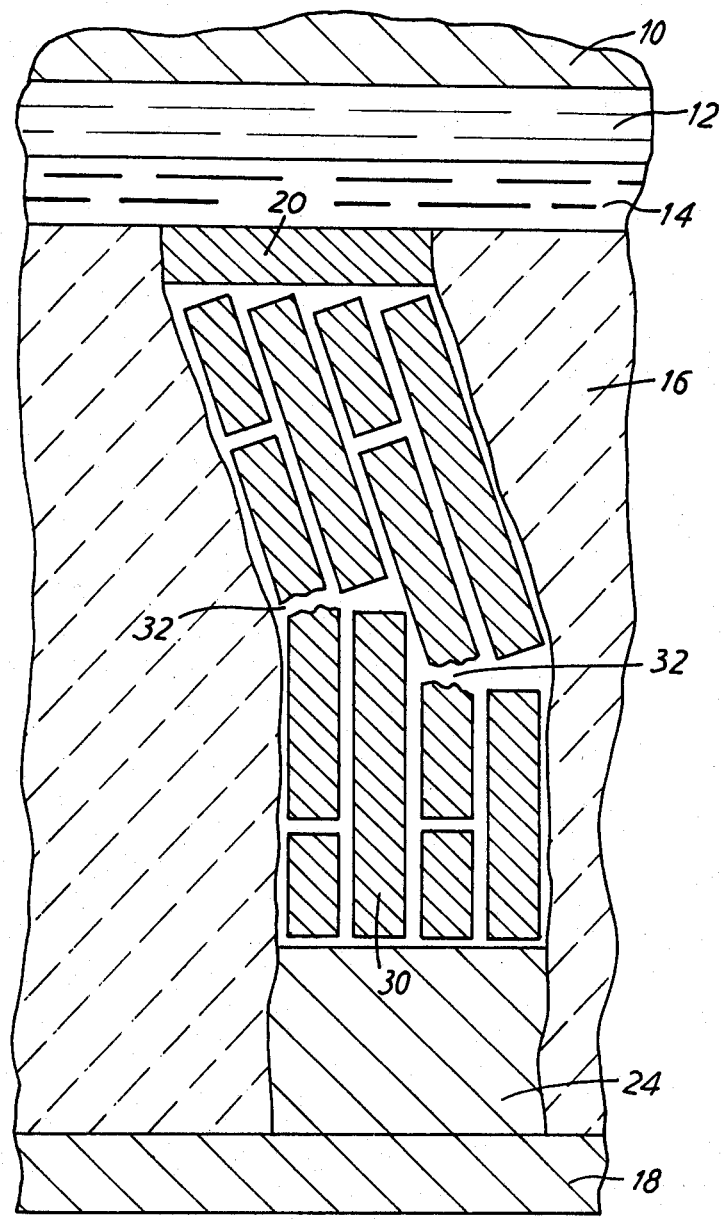
FIGS. 4, 5 and 6 are views corresponding to FIG. 1 showing other constructions of cathode current collector.

In FIG. 4, a cathode current collector embedded in the cell potlining 16 comprises a solid cap 20 (which could be omitted) in contact with the molten cell contents, an upper section consisting of a laminate of four layers of leaves 30 of $TiB_2$, and a lower section consisting of a solid bar 24 of aluminium metal. The leaves 30 are joined and surrounded by aluminium metal which is at least partly fluid when the cell is in operation. During operation there has been movement of the potlining as a result of which the cathode current collector has become distorted. Two of the leaves 30 have been broken at 32, but the gaps have been filled by molten metal so that electrical conductivity is substantially unaltered.

Figure 5:
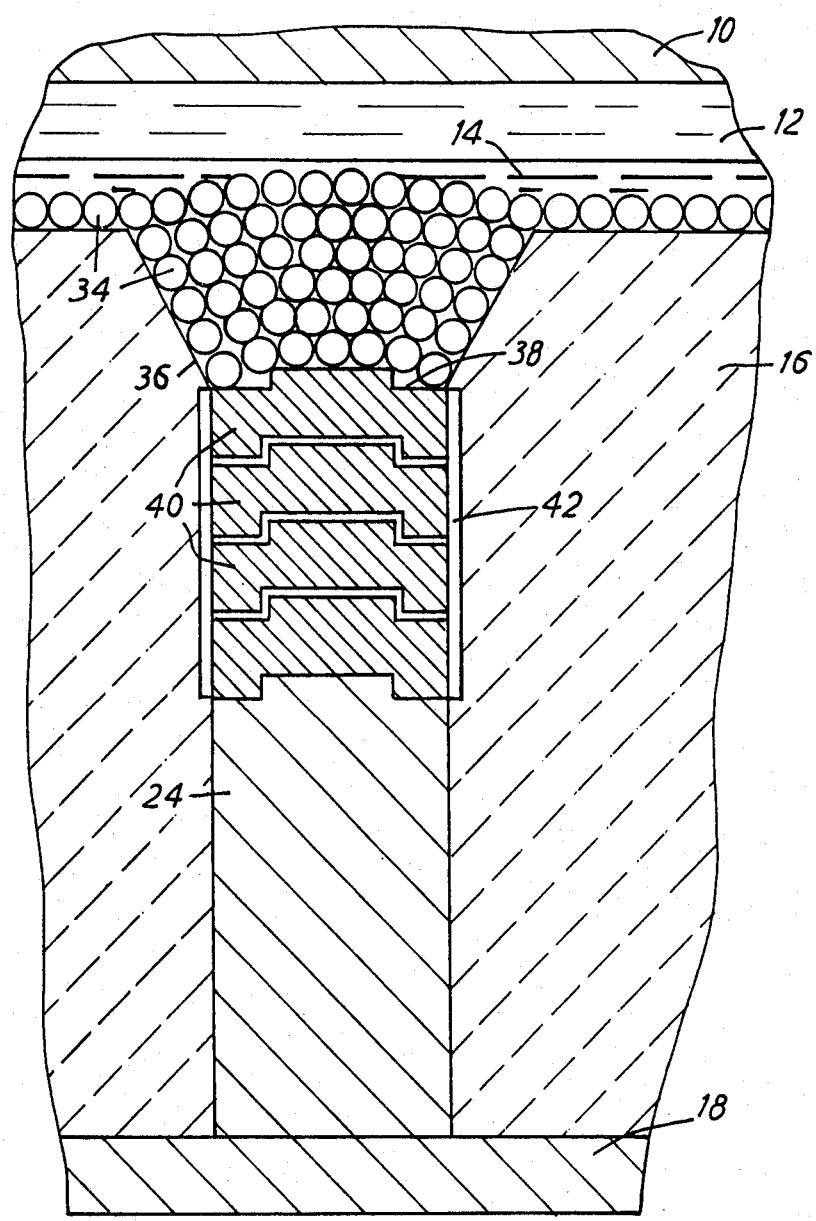

Referring to FIG. 5, the metal pad 14 is shown stabilised by a monolayer of the solid metal-wettable spheres 34. The top end 38 of a cathode current collector is positioned at the bottom end of a depression 36 in the potlining. The collector bar comprises an upper section of a stack of superimposed plates 40 formed of a $TiB_2/Al$ composite material, within a tube 42 of $Al_2O_3$. The individual plates can be made by hot pressing. The stack of plates has been cast within the $Al_2O_3$ tube in aluminium metal to provide the electrical connection.

Figure 6:
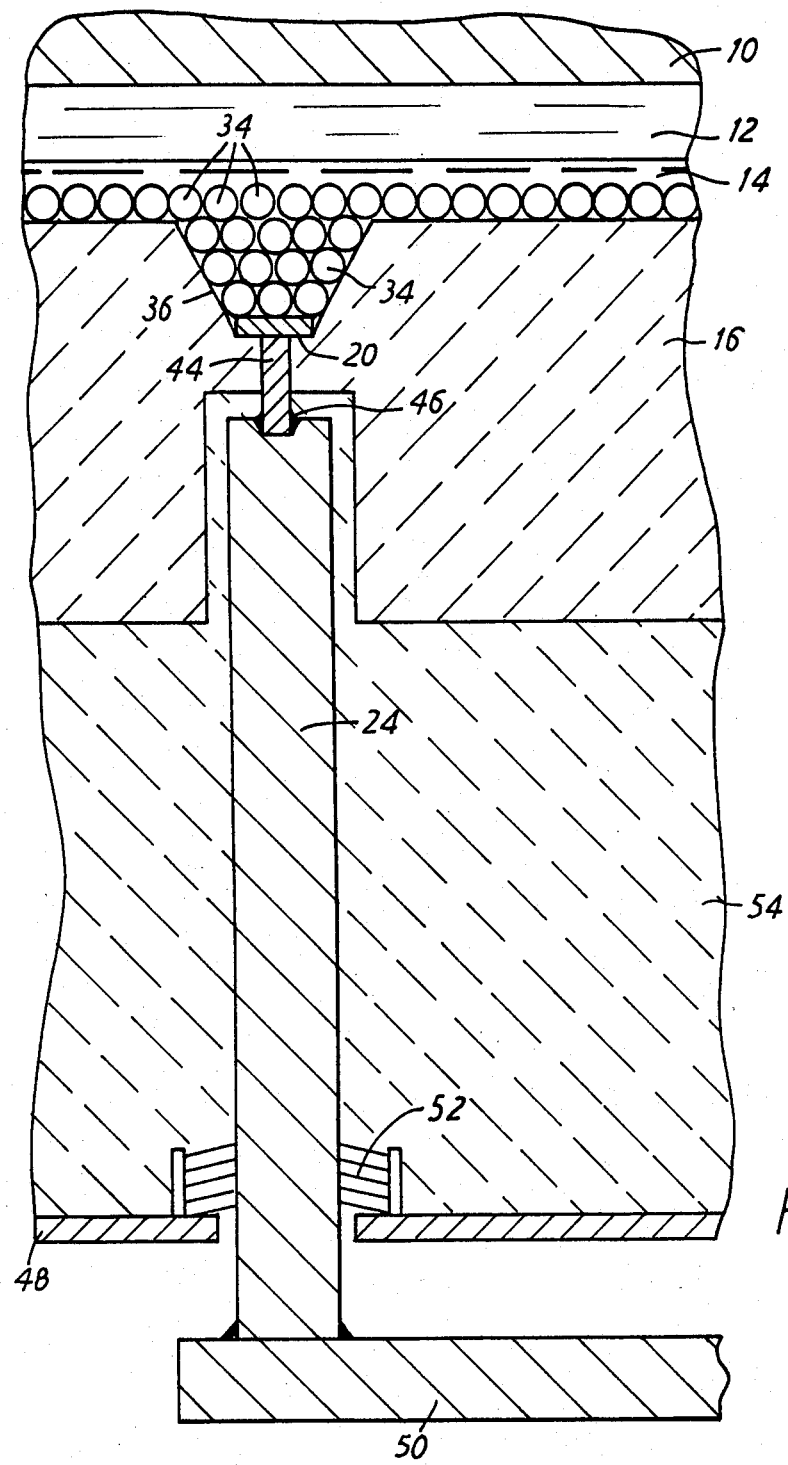

Referring to FIG. 6, the cell is shown as having a molten metal pad 14 stabilised with metal-wetted packing 34, but it should be understood that the molten metal pad does not need to be stabilised. A depression 36 is filled with the metal-wetted packing with molten metal in the interstices which are of such size that electrolyte and sludge are prevented from entering. The top end of the cathode current collector is positioned at the bottom of the depression and consists of a solid block or cap 20 of $TiB_2$. An upper section of the collector is a bar 44 of powder or granules in a matrix of aluminium metal.

which extends between the 950° C. and the 500° C. isotherms. The powder or granules may be of $TiB_2$ or $TiB_2/Al_2O_3$ but is preferably of the $TiB_2/Al_2O_3$ material described in European Patent Specification No. 116809. The bar may be formed by packing the aggregate of powder and granules into the required shape, vacuum impregnating this with molten Al and cooling the product.

In one example, the aggregate bed comprised bodies in three different size ranges: balls up to 19 mm diameter; granules 2-3 mm in size; and powder below 75 microns. As a result of the high proportion (more than 80% by volume) of solid material in the bar, this material carried a substantial proportion of the electric current. Furthermore the electric current did not need to follow a tortuous path through the molten metal in which the solid was dispersed, such as might set up magnetohydrodynamic forces. Thus rapid movement of the molten metal as a result of magnetic stirring, and consequent shifting of the solid material, was effectively damped down.

The lower end of the bar 44 is welded at 46 to a solid aluminium metal rod 24. The cell is shown as having a steel shell 48, and the rod 24 extends through the shell to an aluminium busbar 50 via an air seal 52 of an alumina castable compound or refractory fibre rope. The rod 24 and the busbar 50 are sized to withdraw sufficient heat from the collector structure to maintain the joint 46 at about 500° C. The potlining is shown in two layers, an inner layer 16 of tabular alumina aggegate and an outer layer 54 of metallurgicial grade alumina powder.

Numerous changes are possible in the designs illustrated, as described below.

DETAILED DESCRIPTION

In the aluminium reduction cells of this invention, the nature of the anode and electrolyte and the cathode are not critical and may be as in conventional cells. In particular, the cathode may be constituted by a pool of molten metal overlying the floor of the cell. It is known that magnetohydrodynamic disturbances can cause swirling of metal and wave formation, and that this can be damped down by means of baffles or solid objects in the metal pool. Alternatively, the cathode can be raised above the level of the molten metal/electrolyte interface. Alternatively, the cell can be operated in a drained configuration with a solid cathode, the molten metal as it is formed being caused to flow to a trough for tapping.

It is an advantage of the cathode current collectors of this invention that they permit the use of electrically non-conducting cell lining materials such as alumina. Thus, most of the cell cavity can be filled with powdered $Al_2O_3$, packed as well as possible, at least one layer of dense, tabular $Al_2O_3$ aggregate or bricks being provided on the top surface. With conventional carbon cell linings it may also be advantageous to use the cathode current collectors of this invention, rather than rely on the rather poor electrical conductivity of carbon.

Other features of the cells of this invention may be as described in U.S. patent application Ser. No. 675,718 filed Nov. 28, 1984. In particular, the hot end of the current collector may be situated at the bottom of a depression in the floor of the cell. The depression may be circular, or may be elongate in a direction at right angles to the magnetic field in a molten metal pool in the cell, so as to form a trough. The depression may be filled with metal-wettable bodies with interstices adapted, when the cell is in operation, to be filled with molten aluminium and of a size to prevent entry of electrolyte sludge.

A cathode current collector extends from a hot end, in contact with cell electrolyte or with a pool of molten Al on the floor of the cell, to a cool end where it is connected to the outer shell of the cell or to an external bus-bar. The collector, and the cell lining in which it is embedded, develop in operation a temperature gradient, from 950°-980° C. in the cell to perhaps 200° C. at the outside. Penetration of the cell lining by electrolyte continues until the penetrating electrolyte reaches its solidus, which may be in the range 650°-880° C., depending on the nature of the lining.

It is where penetration of the lining by electrolyte, and in consequence expansion or distortion of the lining, is liable to occur that the section of the current collector comprising the array of shapes embedded in metal is particularly useful. At its hot end, this section may be in direct electrical and thermal contact with the liquid contents of the cell. Alternatively, the hot end of the collector may be composed of a monolithic block of refractory material such as $TiB_2$, with the section composed of an array of shapes embedded in metal positioned on the cool side of the block. At its cool end, the section may be joined to a solid metal lead, e.g. to an Al bar provided that the junction is at a temperature not exceeding 500° C.

Cathode current collector sections can be made by casting the Al-wettable shapes in a melt of Al-containing metal. A problem is that the shapes are not always fully wetted with metal during the relatively short time of the casting process. This does not matter provided that the metal is re-melted during operation of the cell. However, if part of the section remains below the melting point of the metal (i.e. typically below about 660° C.) during operation of the cell, poor wetting of the shapes may lead to excessive electrical resistance.

A solution to this problem is to position the section so that the Al-containing metal in which the shapes are embedded is fluid throughout the length of the section when the cell is in operation. Thus, the section may comprise a bar cast with shapes put only in the portion that is destined to become melted during operation. One convenient way to fabricate such current collectors is to take a mold with a small lower section and a larger upper section, the casting from which will, when inverted, form the current collector for the cell. Prior to pouring in molten aluminium the array of shapes is packed into the lower section to a hight such that, when the inverted casting is installed in the cell, they are just above the intended position of the solid aluminium/liquid aluminium interface. Being denser than the liquid metal they will sink a little during cell operation to the interface itself. Cracks around the surface of the shapes due to shrinkage during solidification of the casting will then not matter, since the region will be re-melted in operation in the cell. Below this interface is a solid metal bar which is easily joined, e.g. by welding, to the lead.

Electrically conducting metal-wettable materials such as $TiB_2$ and the $TiB_2/Al$ cermets described in European Patent Specification No. 115688 can readily be hot pressed into thin sheets which can subsequently be laminated into a sandwich structure with Al metal.

These sheets can conveniently be fabricated as rectangular pieces of thickness from 0.5 cm to 5 cm. The width of such pieces is immaterial and may suitably be the intended width of the section of the collector bar.

The number of such sheets that are laminated together is determined by the desired current density in the collector bar, and varies inversely with the width of the sheets. Then the width of the sheets and the number of sheets laminated together can be chosen in order to limit the number of hot pressing steps having regard to hot press die limitations and the mechanical strength of the individual sheets. The width of the collector bar is likely to be in the range 2 cm to 12.5 cm, usually 3 cm to 6 cm, and the number of sheets laminated together correspondingly in the range 6 to 1, usually 4 to 2.

Fabrication of the laminate can be effected by casting in aluminium. Another approach is to form a bundle of sheets pre-wetted with Al and then weld with aluminium in spots or continuously along the collector bar. Yet another approach is to interleave the bundle of sheets with aluminium foil and heat the bundle in an inert atmosphere or vacuum furnace to above the melting temperature of aluminium. Upon cooling the bundle will then form an integral unit.

The collector bars may be distributed uniformly under the anode shadow or may be offset somewhat to counteract any magnetic field imbalance. The number of collector bars depends on the current loading of each. This will usually be in the range 1–10 KA, preferably 3–6 KA, per collector. The optimum number of collector bars depends on magnetic effects, economics, and, in the case of a retrofit, the existing busbar layout. Thus the minimum current carried is limited by economics, i.e. cost of multiplicity of small busbars, and their mechanical integrity. The maximum current carried is limited by local magnetohydrodynamic effects.

For example, a 175 KA cell may have two rows of 18 collector bars each carrying 4.9 KA. For 22m$^2$ of total anode area there would be 0.6m$^2$ per collector bar. This assumes an anode current density of 0.8 KA/m$^2$.

The cross-sectional area of the upper section of the cathode current collectors is likely in most cases to be chosen in the range 5–75 cm$^2$. Several factors contribute to this. If the cross-sectional area is rather small, then the specific surface area will be rather large which may in turn lead to undesired heat-exchange with the potlining and corrosion. If the cross-sectional area is rather large, excessive cost and heat loss down the collector bar will result. The cross-sectional area is preferably about the minimum required to carry the desired current without excessive voltage drop; not only does this minimise use of expensive refractory material, but also resistance heating keeps up the temperature of the collector and ensures that it does not withdraw too much heat from the cell. Some of these principles of current collector design are discussed by G. C. Seager in Extractive Metallurgy of Aluminium, edited by G. Gerard, published by Interscience Publishers, Volume 2, 1963, page 131.

The cross-sectional shape of this upper section of the collector is not critical. Often it will be convenient to use a square or circular section to minimise specific surface area. However, when the top end of the collector is positioned at the bottom of a trench in the cell floor, it may be preferable to use a collector whose upper section is elongated in the direction of the trench.

The top end of the cathode current collector may be constituted by a solid block or cap of an electrically conducting refractory material resistant to attack by molten aluminium. One suitable material is TiB$_2$; another is a TiB$_2$/Al composite containing a sufficiently low proportion of Al to remain solid under the prevailing conditions.

The solid block or cap can serve three purposes. It can prevent displacement of small aggregate particles out of the collector bar by magneto-hydrodynamic effects. It slows down the diffusion of alloying elements (when used) out of a lower section of the collector. It also closes off individual channels, e.g. formed in an array of parallel rods, and so reduces molten metal circulation between the channels. The location of the solid block or cap is also where changes in current density and direction create magnetic pressure gradients; if there are created inside a solid body, they cannot drive metal motion. However, the solid block or cap is optional, and may be omitted when these considerations are not paramount.

In yet another design (illustrated in FIG. 5), the regular array of solid material may be constituted by a stack of refractory bodies, which may suitably be plate-shaped. The plates may have an indentation on one surface and a corresponding protrusion on the other to assist alignment when stacking. The thickness to diameter ratio of the plates is not critical and can be optimized according to the economic and technical restraints of material production. The plates can be produced by any conventional ceramic route, but the geometry is particularly adaptable to production by hot pressing.

Electrical contact between individual plates is assured by casting the entire stack in aluminium. The stack can be placed in a large-diameter tube of alumina closed at one end, which serves as a mould. A vacuum casting method can also be used.

As previously noted, regular shapes are preferably used having cross-sections smaller than the cross-section of the collector. In addition to squares and rectangles, othr shapes may be used whose cross-sections are capable of fitting together so as to occupy substantially the whole corss-section of the collector bar. Reference may be made to triangles, rhombi, hexagons and even complicated interlocking jigsaw-type shapes.

Another design uses a bundle of rods or fibres, parallel to each other and to the collector axis, the space between these being filled with aluminium-containing metal. It will generally be necessary to use a close-packed array of rods or fibres. A close-packed array of cylindrical rods of uniform diameter occupies 78% of the overall volume, but a larger percentage can be achieved by using rods and fibres of mixed diameters.

This design can be made by using a large-diameter refractory tube, e.g. of alumina, or an Al$_2$O$_3$ castable compound which serves as a mould when casting metal round the rods or tubes, and as the outer surface of the current collector in operation. A mould assembly can be made up with an array of parallel rods or within the large-diameter tube, the whole being closed off at the bottom, and molten metal poured in and allowed to solidify. After cutting off the bottom end and the shrinkage cavity at the top, the assembly is then ready for use as one section of a cathode current collector. A large-diameter refractory tube can also be used in other designs of this section of the current collector. In all cases, the inner surface of the large-diameter tube should be wetted by molten metal in preference to electrolyte. If this inner surface is preferentially wetted by electrolyte, then molten electrolyte is able to penetrate along the surface of the tube, displacing metal and thereby increasing electrical resistance.

On the other hand, the outer surface of the large-diameter tube should preferably be preferentially wetted by electrolyte. Outside the tube, some penetration of electrolyte would not be a problem, but penetration of molten metal could create difficulties.

When pre-casting these collector sections, molten aluminium (of commercial grade or higher purity) may be used. This has the advantage of relatively high electrical conductivity and the disadvantage of rather high fluidity and low melting point. If the latter considerations are important, it may be preferable to us an alloy of lower fluidity and/or higher melting point. Suitable are alloys of aluminium with iron, titanium or molybdenum, the latter two being preferred because the solubilities of their intermetallic compounds in liquid aluminium are usually low. Particularly preferred are such alloys containing also boron, such as the commercially available product TIBOR which contains 10% Ti and 1% B. These alloys contain dispersed particles of $TiB_2$ and also plate-like structures of $TiAl_3$, and these greatly reduce convection effects when the bulk of the metal is in a fluid state.

To avoid any possible difficulties in casting molten alloys of this kind, it is possible to form the alloy in situ. Thus, when parallel refractory rods are assembled inside a mould, it is possible to arrange rods or fibres of e.g. titanium or molybdenum between the rods. When molten aluminium is poured into the mould it reacts with the titanium or molybdenum forming the desired intermetallic compounds just where they are needed.

The lower end of the collector is a solid conductor, generally a metal bar which may be of copper or steel but is preferably of aluminium. The top (hot) end of this bar may be connected to the bottom (cool) end of the section which includes the discrete electrically-conducting metal-wettable bodies. When the section is formed by casting aluminium round the solid material, it may be convenient to cast at the same time a unitary aluminium bar, which can then serve as the lower end of the collector. Alternatively, the two sections can be connected by welding.

In a preferred embodiment, the metal bar is secured at its lower end to a slab of aluminium of sufficient thickness to support the cell.

This slab forms the base of the cell, and may have fins for air cooling or other means for forced cooling to control the cell temperature. The slab acts as a busbar and is electrically connected to the anode of the next cell is series. When the floor of the cell is of aluminium, the outer walls may be of aluminium or steel. Alternatively, the whole shell of the cell may be of steel, and the lower end of the current collector may be bolted to the shell or may extend through the shell for connection to the busbar system.

This specification has referred to the top (hot) end and the bottom (cool) end of the cathode current collector as though this was vertical. In fact, the collector may be vertical, or it may be horizontal and extend through the side wall of the cell; or a vertical hot end may be joined to a horizontal metal bar. It is generally preferred that the hot end of the collector extend vertically down from the cell, as this reduces horizontal electrical currents and magnetic fields and reduces magnetohydrodynamic disturbances in the metal pad.

There is necessarily a temperature gradient along the cathode current collector, from about 950° C. at the hot end to perhaps 200° C. at the cool end. Since $TiB_2$ is a relatively expensive material, it may be desired to reduce the length of sections containing it. But if the metal bar at the lower end is of aluminium, it must not be exposed to temperatures at which it loses mechanical strength, so the junction between the section including the metal-wettable bodies and the metal bar should not exceed 500° C. In order to improve heat control, the cross-section area of the metal bar may increase from this junction downwards.

We claim:

1. An aluminium reduction cell including a potlining and embedded therein at least one cathode current collector including a section comprising a major proportion by volume of discrete electrically-conducting aluminium-wettable bodies joined or surrounded by aluminium-containing metal, the section being so positioned that the metal is at least partly fluid when the cell is in operation.

2. A cell as claimed in claim 1,
wherein the metal-wettable bodies are present in the collector section in close-packed array.

3. A cell as claimed in claim 1,
wherein the metal-wettable bodies have uniform size and shape with cross-sections smaller than that of the collector section.

4. A cell as claimed in claim 3,
wherein the bodies are cubic or cuboid with faces of adjacent bodies positioned parallel to one another.

5. A cell as claimed in claim 3,
wherein the bodies are in the form of sheets or thin slabs and are aligned with their major faces parallel to one another and to the axis of the collector section.

6. A cell as claimed in claim 1,
wherein part of the potlining in which the collector section is embedded is subject to penetration by electrolyte.

7. A cell as claimed in claim 1,
wherein the collector section is so positioned that the aluminium-containing metal joining or surrounding the bodies is fluid throughout the length of the section when the cell is in operation.

8. A cell as claimed in claim 1,
wherein the collector section comprises a stack of metal-wettable plates surrounded and joined by aluminium-containing metal.

9. A cell as claimed in claim 1,
wherein the collector section comprises a packed bed of metal-wettable particles or granules impregnated with aluminium-containing metal.

10. A cell as claimed in claim 1,
wherein the top end of the collector consists of a cap of solid refractory electrically conducting material.

11. A cell as claimed in claim 1,
wherein the collector section is contained within a refractory tube of which the inner surface is wetted by metal in preference to electrolyte and the outer surface is wetted by electrolyte in preference to metal.

12. A cell as claimed in claim 1,
wherein the potlining material is based on alumina.

13. A cell as claimed in claim 1,
wherein a plurality of cathode current collectors is present each having a collector section of from 5–75 $cm^2$ cross-sectional area and designed to carry from 1 to 10 KA.

* * * * *